US005243336A

United States Patent [19]

Noonan et al.

[11] Patent Number: 5,243,336

[45] Date of Patent: Sep. 7, 1993

[54] RELAY SUPERVISION SYSTEM

[75] Inventors: Leonard Noonan, Stanhope; William R. Vogt, Rockaway, both of N.J.

[73] Assignee: Baker Industries, Inc., Parsippany, N.J.

[21] Appl. No.: 570,767

[22] Filed: Aug. 22, 1990

Related U.S. Application Data

[63] Continuation of Ser. No. 393,737, Aug. 15, 1989, abandoned, which is a continuation-in-part of Ser. No. 102,995, Apr. 29, 1988, abandoned.

[51] Int. Cl.[5] .............................................. G05B 23/02

[52] U.S. Cl. ................. 340/825.18 D; 340/825.16 D; 340/825.17 D

[58] Field of Search ...................... 340/825.18, 825.16, 340/825.17, 505, 514, 825.36, 825.49, 310 R, 310 A

[56] References Cited

U.S. PATENT DOCUMENTS 4,405,922 9/1983 Nishino et al. ................ 340/825.36

4,507,652 3/1985 Vogt et al. ................ 340/825.36 X

*Primary Examiner*—Ulysses Weldon

*Attorney, Agent, or Firm*—James J. Jennings

[57] ABSTRACT

A relay supervision system is disclosed to check the presence and operability both of a relay and the associated circuitry located at a position remote from the control unit which effects the supervision. The supervision is accomplished by pulsing the relay with energy at a volt-time integral less than that required to energize the relay and displace a contact set, but sufficient to cause current flow through the winding and its associated circuit components. If the relay includes two separate windings, each winding can be separately pulsed at different times, the relay state determined, and both windings effectively supervised without changing the position of the contact sets operated by the windings. Energy is saved by terminating current flow through the just-energized relay winding as soon as the relay contact set is driven to its desired position.

13 Claims, 4 Drawing Sheets

RELAY SUPERVISION SYSTEM

RELATED APPLICATION

This application is a continuation of an earlier application filed Aug. 15, 1989, Ser. No. 393,737, now abandoned with the same title and inventors, which in turn was a continuation-in-part of an earlier application with the same title and inventors, filed Apr. 29, 1988, Ser. No. 102,995 now abandoned.

BACKGROUND OF THE INVENTION

The present invention relates to a system for and method of determining the presence and operability of a relay and its associated components. More particularly, the invention includes a circuit and method for remotely checking the integrity not only of both windings of a dual coil latching relay, but also verifying the relay state (including whether the relay is on, off, or missing).

In various control systems, relays are placed at a considerable physical distance from the controller which ordinarily regulates energization and de-energization of those relays. Examples of such systems are described and illustrated in U.S. Pat. No. 4,394,655, issued Jul. 19, 1983; U.S. Pat. No. 4,470,047, issued Sep. 4, 1984; and U.S. Pat. No. 4,507,652, issued Mar. 26, 1985. All of these patents are titled "Bidirectional, Interactive Fire Detection System" and all are assigned to the assignee of this application. It will become apparent that the present invention finds particular utility with the systems taught in these patents, and also much wider application where remotely located relays must be supervised from a control point.

In the systems described in the references cited above, a controller issues commands over a pair of conductors to one or more transponders coupled to that same conductor pair. In turn the transponders both reply to the controller and, when commanded, take other action such as regulating a relay, a fan or blower, an alarm bell, a fire door, and so forth. Manifestly many of these functions have enormous importance to life safety and property conservation, and therefore it is highly desirable to know that the components connected to perform these important tasks will actually do so when called upon to operate.

It is therefore a principal consideration of the present invention to check the presence and operability of remotely positioned relays, and of the electrical circuitry associated with such relays.

The present invention is particularly useful for remotely supervising a dual coil latching relay which has first and second windings coupled to a pair of electrical conductors. The relay also includes at least one contact set for displacement as either relay winding is energized. A transponder, coupled both to the conductor pair and to the relay, provides a first supervisory pulse signal to the first relay winding in a first predetermined time period. The supervisory pulse signal is at a power level below that required to displace the relay contact set. A controller, also coupled to the conductor pair, includes sensing means operable during the first predetermined time period to sense the presence or absence of current flow through the first relay winding. The presence of current flow confirms both the presence and operability of the relay and of its associated circuitry.

The invention can also be practiced as a method for supervising a dual coil latching relay having a pair of windings coupled to a pair of electrical conductors at a location remote from a control point. The relay has at least one contact set for displacement as either relay winding is energized. In this method a supervisory pulse signal is provided to the first winding in a predetermined time period. The pulse signal is at a power level below that required to displace the relay contact set. Then, during the first predetermined time period, the presence and absence of current flow through the first relay winding is sensed, to confirm both the presence and operability of the relay and of its associated circuitry by noting the presence of current flow. Similar pulsing is done for the second relay winding, in a second predetermined time period time period, at a power level below that required to actuate the relay contact set.

According to another aspect of the invention, a method is provided to conserve energy by terminating energization of the just-energized relay winding as soon as the displaced contact set has completed its desired travel from one position to the other.

THE DRAWINGS

In the several figures of the drawings, like reference numerals identify like components, and in those drawings.

DETAILED DESCRIPTION OF THE INVENTION

Figure 1:
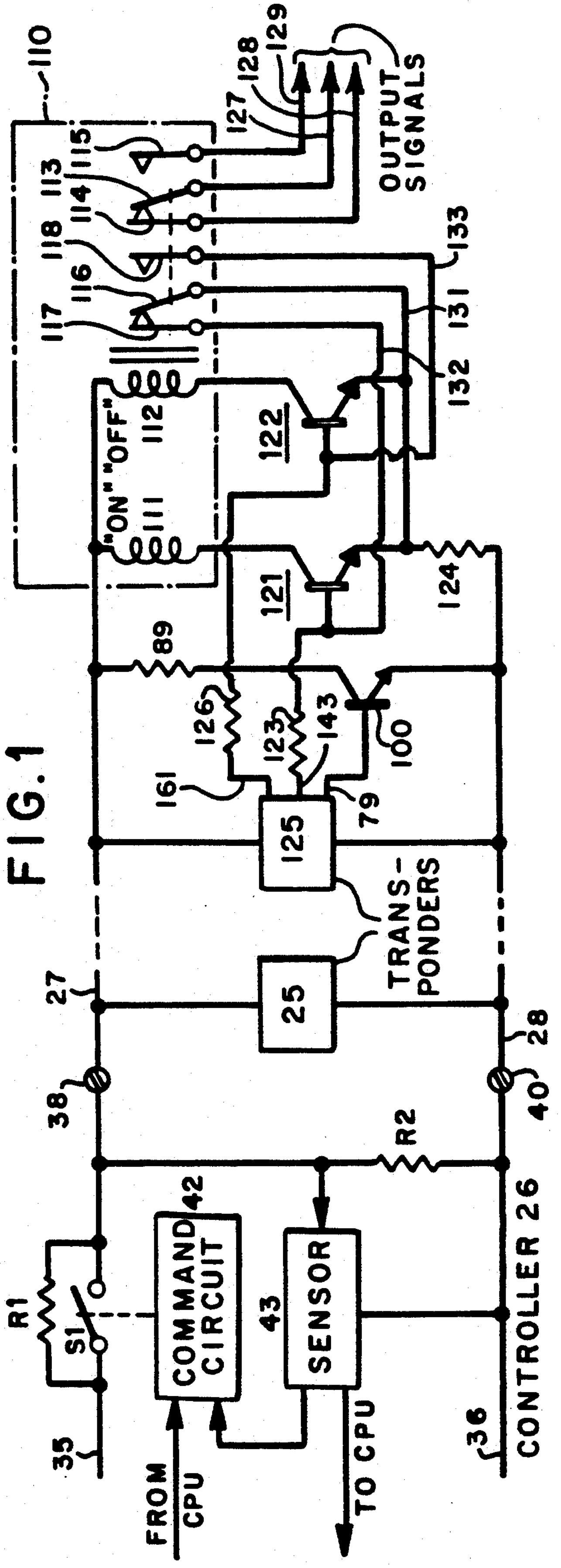
FIG. 1 is a schematic diagram, partly in block form, depicting an embodiment of the invention.

The present invention is useful to supervise relay windings in general, and finds particular utility in systems of the type disclosed in the three above-identified patents. The teachings of all those patents are hereby incorporated by reference and made a part of the present disclosure. To simplify the understanding and minimize reference to the earlier patents, reference numerals up to 100 will be used in connection with FIG. 1 of this application, to identify components shown with the same reference numerals in U.S. Pat. Nos. 4,470,047 and 4,507,652.

As shown in FIG. 1 of this application, a controller 26 communicates over a pair of conductors 27, 28 to a plurality of transponders 25 and 125, as described in connection with the cited references. A certain voltage V is applied between conductors 35 and 36. Switch S1 is closed (also referred to as "LINES-HIGH") to pass this voltage directly over screw terminals 38, 40 to the line conductor pair 27, 28. When S1 is opened (also referred to as "LINES-LOW"), resistor R1 is in the circuit and a reduced voltage is thus applied to terminals 38, 40. At this time (S1 open) the transponders may "talk" back to the controller by further lowering the voltage, as by pulsing on transistor 100 shown to the right in FIG. 1. This lowered voltage is detected by sensor 43 in the controller, which passes information both to a central processor unit or CPU (not shown) and to a command circuit 42, which regulates operation of S1 The command circuit also receives input information from the CPU. Sensor 43 may be an evaluation circuit for detecting different voltage levels and providing signals in accordance with those different levels, as described in the cited references.

A latching relay 110, shown in the right portion of FIG. 1, includes a pair of windings 111 and 112, a first or output contact set including movable contact 113 and fixed contacts 114 and 115, and a second or additional contact set including movable contact 116, and fixed contacts 117 and 118. This latching relay is analogous to the latching relay 58 shown in FIG. 8 of U.S. Pat. No. 4,394,655, and to the latching relay 75 depicted in FIGS. 7 and 8 of the two later U.S. Pat. Nos. 4,470,047 and 4,507,652. However latching relay 110 includes an additional contact set 116–118, as contrasted to the earlier showings, for reasons that will become apparent.

The term "relay", as used herein and in the appended claims, includes at least one winding and at least one contact set for actuation when the winding is energized.

A pair of semiconductor switches 121 and 122, shown as NPN type transistors, are provided as driver units for the relay windings 111, 112. Transponder 125 can provide a driving pulse over conductor 143 and resistor 123 which is coupled to the base of transistor 121, and the emitter of this transistor is coupled through a common resistor 124 to conductor 28. The collector of transistor 121 is coupled to one end of winding 111, the other end of which is coupled to line conductor 27. Another resistor 126 is coupled over conductor 161 to transponder 125, and is also coupled to the base of transistor 122, the emitter of which is coupled through resistor 124 to conductor 28. The collector of transistor 122 is coupled through winding 112 to conductor 27.

In latching relay 110, output contact set 113–115 is coupled over conductors 127, 128 and 129 to provide output signals to any suitable associated components (not shown) of the type referred to generally above.

In accordance with an important aspect of the invention, the second contact set, including contacts 116, 117 and 118, both senses the positions of output contact set 113–115 and functions as a shut-off means in conjunction with transistors 121 and 122. This additional contact set 116–118 is coupled over conductors 131, 132 and 133 to the base-emitter circuits of the two driver transistors. In the position shown, contacts 116, 117 effectively short the base-emitter circuit of transistor 121, thus preventing this transistor from being driven on, notwithstanding any drive received over resistor 123 from transponder 125. Similarly when the movable contact 116 is displaced from the illustrated position to engage fixed contact 118, a circuit is completed over conductors 131 and 133 to effectively short the base of transistor 122 to its emitter, preventing its turn-on. Such dual latching relays are known and commercially available, and one suitable type is the DS2E-ML2-DC12V relay produced by Aromat Corporation. The relay supervision system is useful with arrangements such as those described in which multiple voltage levels are used to distinguish between those periods in which the controller is sending commands to the transponders, and other periods in which the transponders are replying to the controller. Examples of such multiple voltage level communication systems are shown in FIGS. 4, 5, 6A, 6B and 6C of U.S. Pat. No. 4,507,652. Referring by way of example to FIG. 6A, the lines are high or at a voltage level V as shown during a part of the time, and the lines are low (at V/2, V/3, V/4, and so forth) in the other time periods. In FIG. 1 of this application, coil 111 of relay 110 will be considered the "ON" coil which is energized to place the contacts in the positions illustrated, and coil 112 is considered the "OFF" coil utilized to displace the contacts from the positions shown.

Figure 2:
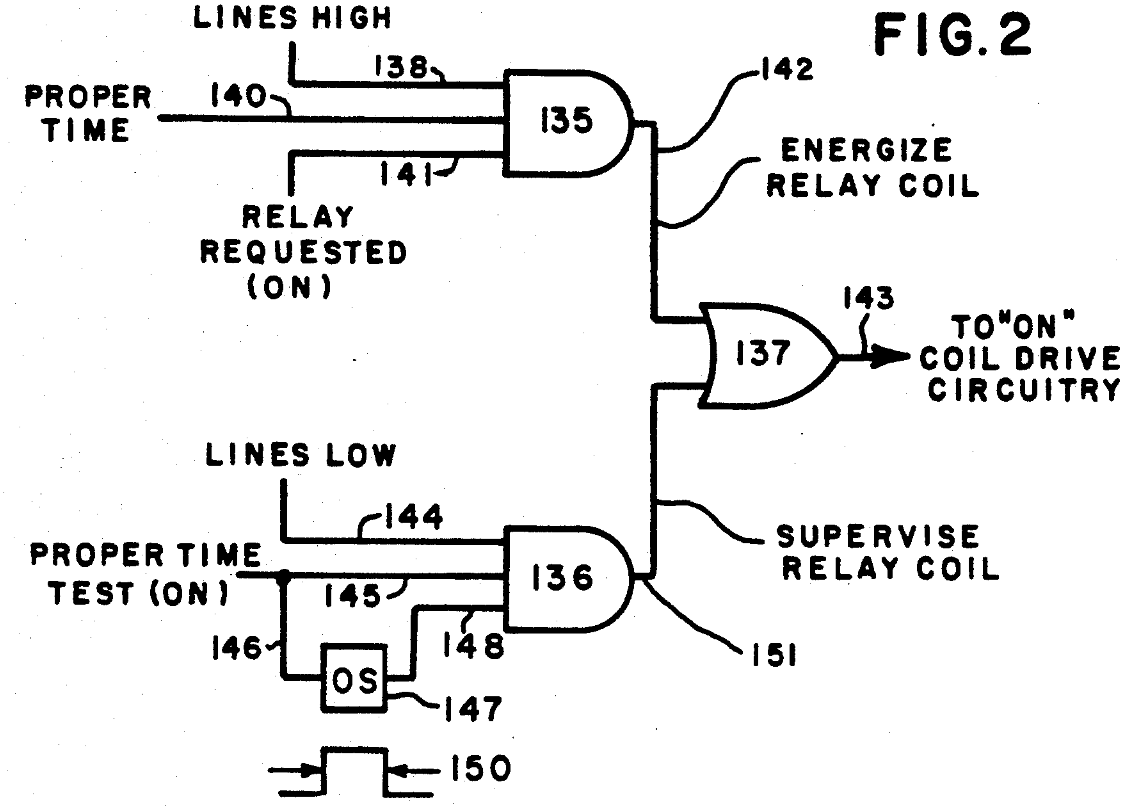
FIGS. 2 and 3 are logic diagrams useful in understanding operation of the invention.

In FIG. 2, the transponder circuitry shown to provide the drive signal for "ON" coil 111 includes a pair of AND gates 135, 136 and an OR circuit 137. Such drive signal would be provided through resistor 123 to the base of transistor 121, to energize coil 111 and displace contact set 116–118 from the position in which movable contact 116 engages fixed contact 118 to the illustrated position in which contacts 116 and 117 are engaged. During a time interval when the lines are high, a signal indicating the lines are high is provided over conductor 138 to AND circuit 135. One suitable circuit for determining when the lines are high will be described later in connection with FIG. 6, and the teaching for such determination is also found in the patents incorporated herein by reference. If this is the proper time for a relay energization, such as the third "high" in a series of high-level pulses alternating with low-level pulses, this is indicated by a suitable signal provided on line 140. If it is desired to turn on relay 110, as signalled (for example) by elongating a high-level pulse, this is indicated by an appropriate digital signal on line 141. If all three of these signals are present, a command to energize winding 110 issues from AND circuit 135 over line 142, and passes through OR circuit 137, over conductor 143 and resistor 123 (FIG. 1), to the base of transistor 121. As shown the transistor cannot be turned on because the contacts are already in the on position, and the base and emitter of transistor 121 are effectively shorted together over the contact set 116, 117. Nevertheless the turn-on signal is provided from OR circuit 137 over conductor 143 in an attempt to operate the driver unit, or transistor, 121.

The lower portion-of FIG. 2 depicts that part of the logic circuitry utilized to provide a "test" or supervisory signal over line 143 in an attempt to provide current flow through relay winding 111. As there shown, a signal is provided on input conductor 144 when the voltage between line conductors 27, 28 is low. Another signal is provided on line 145 when the proper time (such as the beginning of the third low-level pulse, when S1 is open causing impedance R1 to reduce available power to line 27, thereby insuring the power available to the relay is insufficient to effect contact transfer) for the test of the "ON" winding occurs. This signal is also passed over line 146 to a timing means 147, the output of which is coupled over line 148 to another input connection of AND gate 136. Timing means 147 can be a one-shot circuit or a multivibrator of well known construction and operation. When a signal appears on line 146, the signal appears on line 148. At the expiration of a time interval 150, represented by the short pulse signal shown just below timing means 147, the signal changes state on 148 so there is no longer any output from AND gate 136 over conductor 151. In the preferred embodiment, this insures that the time duration of the signal passing through OR gate 137 to the "ON" coil drive circuitry is kept to a time duration such that the test current will not interfere with data being sent later in the identified low-level pulse.

The logic circuitry in the lower portion of FIG. 2 provides a supervisory pulse signal on line 143 which attempts to send current flow through the "ON" coil, but at a level less than that required to displace the contact set. This low power level of the supervisory pulse signal could have been insured by the use of the timing means, such as 147, to regulate the time duration of the pulse to a level less than that which is necessary to effect contact transfer. Those skilled in the art will appreciate there are various ways of insuring that the appropriate power level of the test signal is provided so that an undesired actuation of the relay does not occur.

Figure 3:
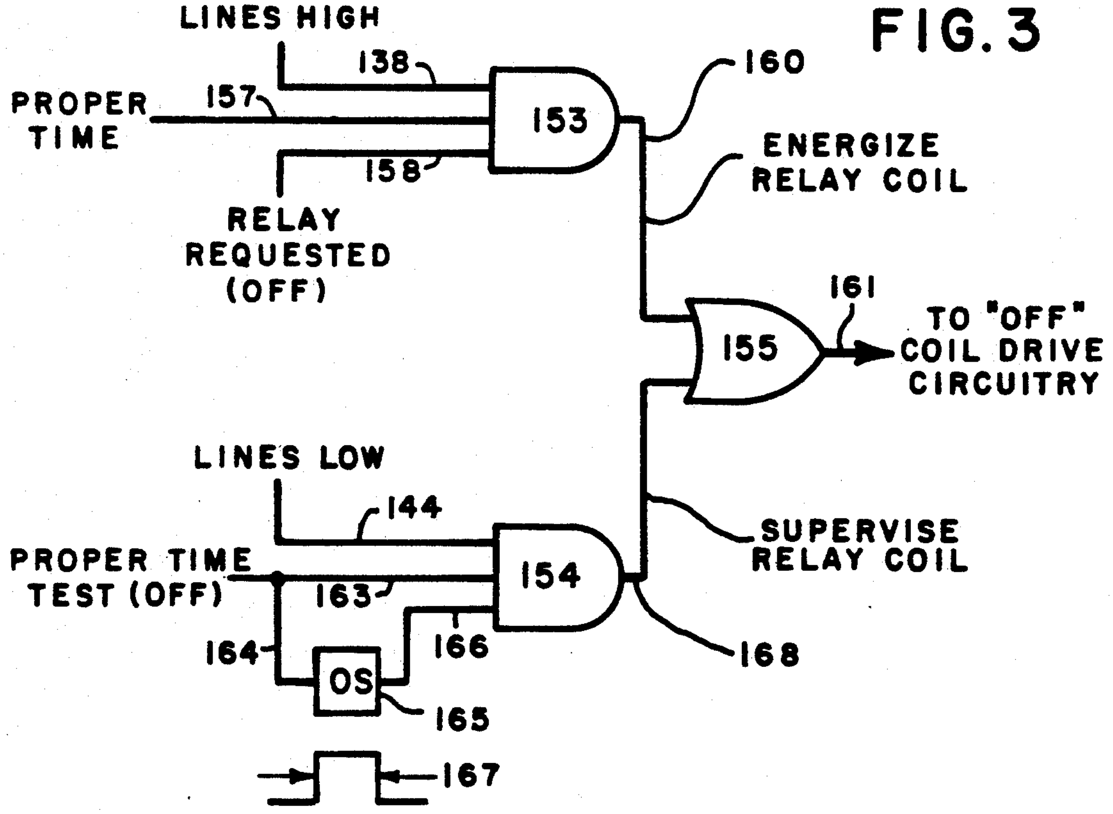

FIG. 3 depicts another logic arrangement utilizing AND circuits 153, 154 and an OR circuit 155, connected to provide the appropriate signals to the "OFF" winding 112. Like the circuit of FIG. 2, the circuit in FIG. 3 can be considered a logic means, coupled to the relay, for providing an energizing pulse signal to the appropriate relay winding (112, in the case of FIG. 3) when energization of this winding is directed, and for providing an appropriate supervisory pulse signal to the same relay winding during a predetermined time period. This time period is predetermined by the signals supplied to AND gate 154.

The signal indicating that the voltage on conductors 27, 28 is high is applied over conductor 138 to one input of AND gate 153. The proper time (such as the fourth "high" in the pulse series) signal is applied over line 157 to another input of the AND gate, and the signal on line 158 (for example, by extending the duration of the fourth high) indicates when there is actually a request that relay 110 be actuated to the "OFF" position by energizing winding 112 and displacing the contact set. When all three of these signals are present at the inputs of AND gate 153, an output signal is provided over line 160, through OR gate 155 and conductor 161 to the circuit including resistor 126 (FIG. 1) to drive on transistor 122. This occurs by causing current flow through the base-emitter circuit, and with the appropriate potential difference present between conductors 27 and 28 (S1 closed, "LINES-HIGH"), transistor 122 is driven into conduction and current flows through winding 112. As this occurs the contact sets of relay 110 are displaced from the illustrated position to the alternate, off position. In this off position output contact 113 engages fixed contact 115, and in the additional contact set movable contact 116 now engages contact 118. In effect lines 131 and 133 are shorted together, likewise shorting the base-emitter circuit of transistor 122, thereby inhibiting (providing shut-off means to) this transistor. Note that the action of turning off the transistor is a result of the contacts actually transferring. Of importance is the fact that the relay windings remain energized until contact transfer has occurred. This results in a minimum amount of power needed to perform the transfer, while assuring that the transfer actually takes place. However to consider the remainder of the circuitry in FIG. 3, it will again be assumed that the contacts of relay 110 are in the positions indicated in FIG. 1.

To supervise relay winding 112, when the voltage level between conductors 27 and 28 is low, an appropriate signal is passed over conductor 144 to one input of AND gate 154. At the proper time (such as the beginning of the fourth low-level pulse, when S1 is open causing impedance R1 to reduce available power to line 27, thereby insuring the power available to the relay is insufficient to effect contact transfer) for the test of the "OFF" winding, the appropriate signal is passed over line 163 to the second input of AND gate 154, and over conductor 164 to another timing means or one-shot circuit 165. The output of the timing means is coupled over conductor 166 to the third input of AND gate 154. When the signal on line 164 initially appears at the input of one-shot circuit 165, an output likewise appears on line 166. This signal remains there for the time duration indicated by the pulse 167 just below circuit 165. At the expiration of this period, the signal on line 166 goes low again, thus terminating the output which previously was passed from the output of AND gate 154 over line 168 to the other input of OR circuit 155. In the preferred embodiment, this insures that the time duration of the signal passing through OR gate 155 to the "OFF" coil drive circuitry is kept to a time duration such that the test current will not interfere with data being sent later in the identified low-level pulse. During the time in which all three inputs are present at the AND gate, the output is present on line 168 and is passed through OR gate 155, over line 161 and resistor 126 (FIG. 1), and drives on the base-emitter circuit of transistor 122, causing the sensing current to flow through relay winding 112. The manner in which the supervisory pulse is sensed or detected back at the controller will now be described.

Figure 4A:
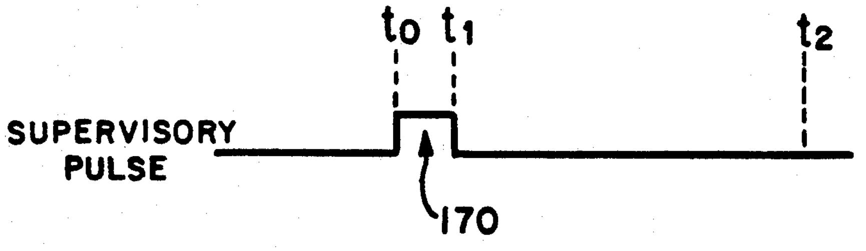
FIGS. 4A, 4B and 4C are graphical illustrations.

FIG. 4A depicts a supervisory pulse signal 170 of the type already described in connection with FIGS. 2 and 3. As shown in FIG. 4A, the pulse is initiated at time t0 and terminated at time t1. The time between t0 and t1 is the predetermined time period, that is, a time interval when the supervisory pulse signal is sent to the relay winding(s) and during which sensor means, at the controller, detects any current flow through the winding(s). More particularly, in the preferred embodiment the supervisory pulse 170 is issued near the beginning of the "LINES-LOW" interval, to prevent disruption of the data appearing later in the same interval.

Figure 4B:
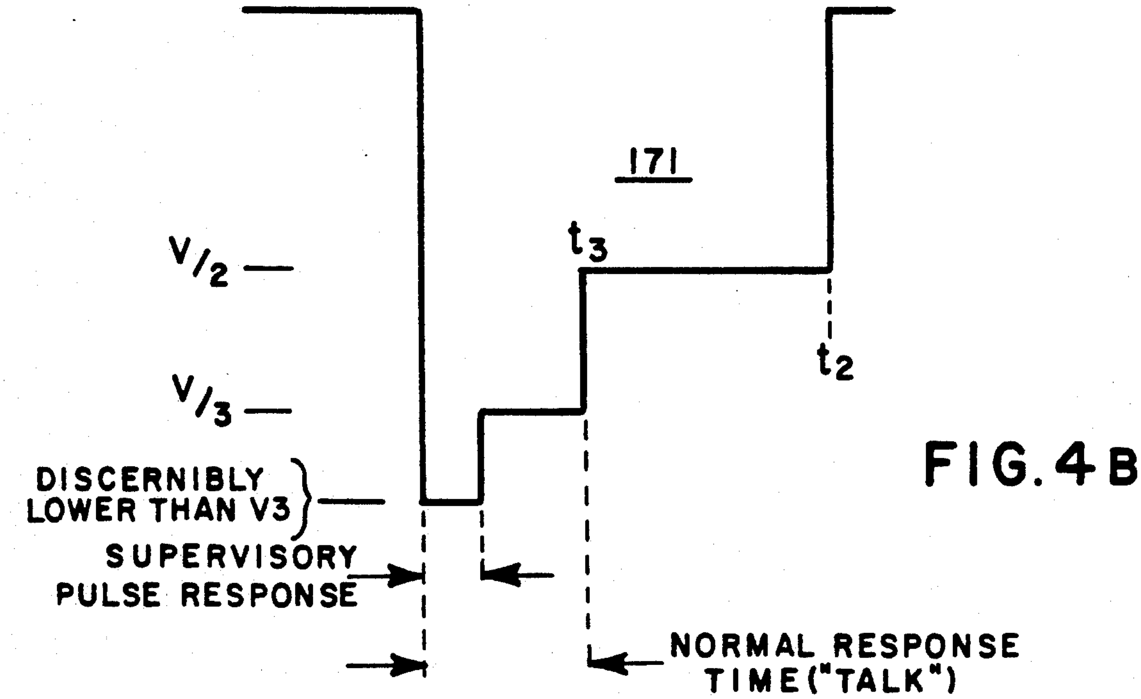

FIG. 4B shows a waveform 171 indicating a normal response from a transponder as sensed at the controller, in addition to the added response with a supervisory pulse response present. As there shown the result of pulse 170 adds to the effect of the usual transponder response, which is already pulling down the voltage level between the line conductors, so that during the time between t0 and t1 the voltage level is discernibly lower than the usual transponder response. After this time, between t1 and t3 as shown in FIG. 4B, the voltage level is at V/3, indicating the transponder is still replying to the controller using the techniques described in the referenced patents. This communication ends at time t3, and the voltage level rises to V/2 and remains there until the end of the response period (t2), when the lines again go high. Because the supervisory pulse signal is of a relatively short duration, it is still an easy matter for the controller to determine the time measurement between t0 and t3, and thereafter translate the duration of this analog signal into the appropriate information for use at the controller.

Figure 4C:
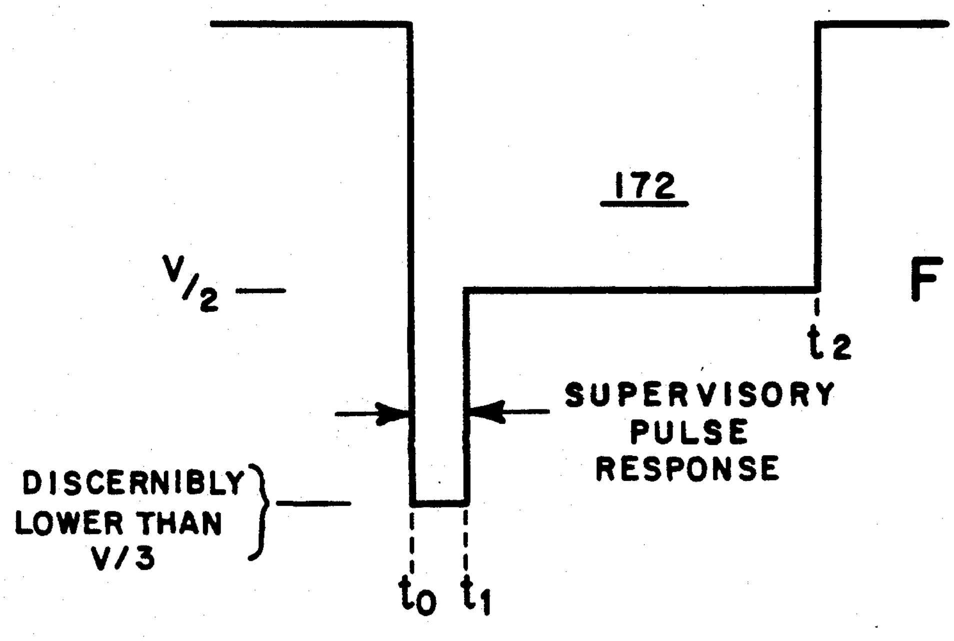

FIG. 4C depicts another pulse 172 illustrating the supervisory pulse response during a "LINES-LOW" period, from t0 to t2, in which the normal response from a transponder is absent. At time t0 the line is pulled down to a level discernibly lower than the usual transponder response and remains there until time t1. This allows sufficient current flow through the supervised winding (if the associated semiconductor switch is operable and not inhibited by the associated relay contacts) to "tell" the controller that the winding and its associated circuitry are present, operable and not inhibited. The supervisory pulse response terminates very early in the low portion of the signal, at time t1, and at time t2 the line again returns to the level V.

Figure 5:
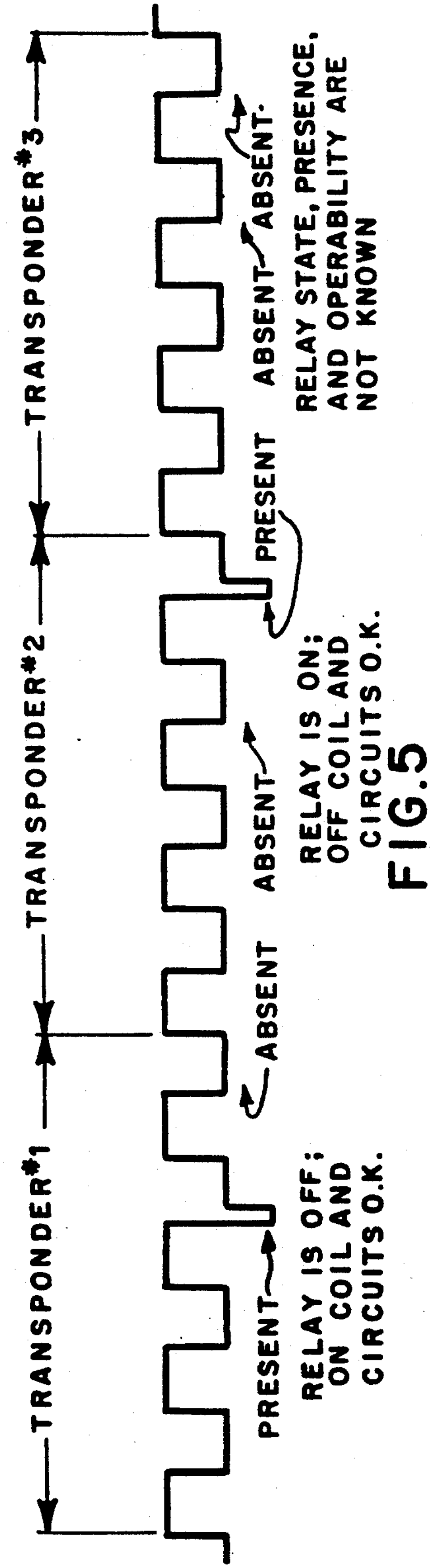
FIG. 5 is an extended graphical illustration, all setting out waveforms or portions thereof to assist in understanding the present invention.

FIG. 5 depicts a succession of high and low voltage levels, or high and low pulses, in which communication between a controller and transponder is effected as described in connection with the cited patents. That is, the four "highs" in each cycle of four pulses are utilized to translate commands from the controller to the respective transponders; the four "lows" are utilized to allow the transponder to reply to the controller, and the controller to sense what is happening at the transponders by sensing the voltage level on the conductor pair. For purposes of this disclosure, it is assumed that: the third high in each set of pulses is used to translate a command for a transponder which has a relay connected to it to transfer that relay to the on condition; the fourth high is used to send a message to turn the relay off; and the third and fourth lows are used to receive information from the individual transponders, as well as the information sensed by the controller to determine the presence and operability of the relay windings and their associated circuits.

By way of example, if transponder number 1 is addressed and a supervisory pulse is generated during both the third and fourth lows (in FIG. 5), the supervisory pulse response shown, present during the third low and absent during the fourth low, indicates that the relay is then in the "OFF" condition, and moreover that the "ON" coil and its associated circuitry are both present and operable, because current flow through this circuit has been sensed. At transponder number 2, the supervisory pulse response, absent during the third low and shown present during the fourth low, indicates that the relay associated with transponder number 2 is in the "ON" position, and that the "OFF" coil and its associated circuits are in condition for operation. The absence of any supervisory pulse responses from transponder number 3, during the third and fourth lows, indicates that the relay's state is unknown, and either the relay is not present, or the relay and/or its associated circuitry are not functional. Thus, the results of sensing the presence or absence of current flow through "the first winding and its associated circuitry" and "the presence or absence of current flow through the second winding and its associated circuitry" allows determination of the state of the relay, as well as the potential operability of the relay and all of its associated circuitry. Accordingly this very important information is derived with the addition of a simple logic arrangement and an extra relay contact set.

Figure 6:
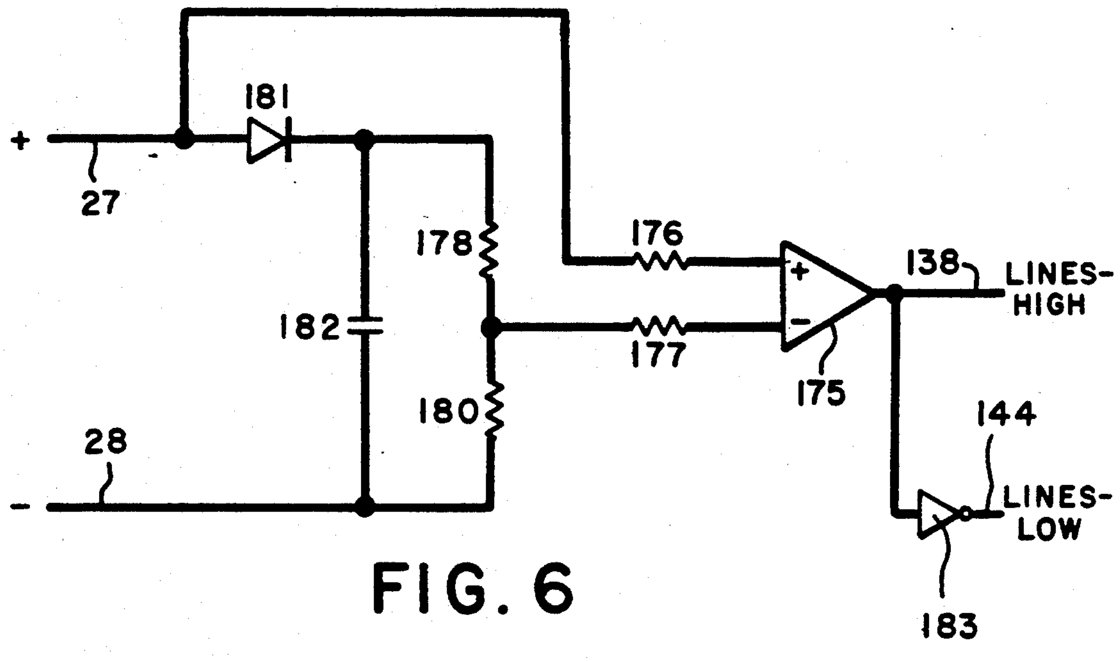
FIG. 6 is a partial schematic diagram useful in understanding operation of the invention.

One way to determine when the lines are high, for providing a suitable logic signal on line 138 of FIGS. 2 and 3, is shown in FIG. 6. A comparator 175 has its positive input coupled over resistor 176 to input line 27, the plus side of the conductor pair. The other input, the reference input, of comparator 175 is coupled over another resistor 177 to the common connection between a voltage divider including resistors 178 and 180. The end of resistor 178 remote from the common connection with resistor 180 is coupled to the cathode of a diode 181, the anode of which is coupled to input line 27. The end of resistor 180 remote from the common connection is coupled to input line 28. A capacitor 182 is coupled across the voltage divider 178, 180 as shown. In the preferred embodiment, resistor 180 is equal to twice the value of resistor 178, resulting in a reference value of two-thirds the voltage stored on capacitor 182. As the lines go high, and are additionally "powered up" as explained in the cited references prior to each cycle of polling, capacitor 182 will be charged to a voltage level approximately that of the high pulse level, or "V". This level is divided to two-thirds "V" by the circuit 178, 180 and applied over resistor 177 to the reference input of comparator 175. Thus when the line goes high, as represented by a high level pulse potential difference between the conductor pair 27, 28, the signal over resistor 176 to the other input of comparator 175 goes higher than the reference voltage at the other input, switching the "LiNES-HIGH" output signal on conductor 138 to a logical "ONE". This is applied to one input of AND circuit 135 in FIG. 2 as explained above.

The "LINES-LOW" signal can be provided for conductor 144 in FIGS. 2 and 3 as shown in FIG. 6 by coupling the "LINES-HIGH" signal to inverter 183. The output signal of invertor 183 is "LINES-LOW" on conductor 144. A complete description of the manner in which the different times and pulse levels are utilized is found in the three references cited above and incorporated by reference in the present teaching. FIG. 6 is given to simplify the understanding of the present invention.

TECHNICAL ADVANTAGES

The present invention allows the physical presence of a relay winding, the relay's state, and of the integrity of its associated circuitry, to be monitored from a point remote from the relay installation. If the relay is used for a critical function, such as sounding an alarm bell to tell inhabitants of a building that a serious condition has occurred and the building should be evacuated, or to close a fire door, it is important to test the relay periodically. If an alarm bell is tested by actually being rung very frequently, the persons in the vicinity will soon come to ignore the alarm bell and it will not have the desired alarm signal effect when it is actually sounded in the event of a catastrophe. By sending current through the relay winding at a level less than that which will actuate or displace the contacts, the supervisory pulse signal can be sensed back at the control point and the integrity determined. Detection of the current signifies not only that the relay winding is present and properly connected, but that all of the associated circuitry is in functioning condition. When used in connection with a transponder of the type described in the referenced patents, the controller can determine that the transponder has properly decoded the address, the counter logic is operating properly, and the previous output command was properly performed (relay in proper state). Thus virtually every portion of the system utilized in receiving and translating the instruction, and then sending the current through the relay, is properly checked out with the provision of the supervisory pulse signal. This is an important advantage over earlier systems which cannot determine the relay's present state or whether it is capable of transferring to the opposite state.

Those skilled in the art will appreciate that knowing both the actual state of the relay and the expected state allows for a multitude of subsequent actions, such as identifying troubles, attempting to switch the relay to the proper state (if not already in the proper state), confirmation of relay transfers, and so forth.

Another important invention is that energy is conserved because the just-driven-on transistor has its conduction terminated as soon as the relay contact set is driven over to the new position. This is accomplished by the additional contact set which effectively shorts the base-emitter circuit of the just-energized transistor and thus saves the energy of the system.

In the appended claims the term "connected" means a d-c connection between two components with a virtually zero d-c resistance between those components. The term "coupled" indicates there is a functional relationship between two components, with a possible interposition of other elements between those two components described as "coupled" or "intercoupled".

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

We claim:

1. A system for remotely supervising a dual coil latching relay having a first winding and a second winding, and having at least one contact set for displacement as either relay winding is energized, comprising:

transponder means, coupled to the relay, for providing a first supervisory pulse signal to the first relay winding in a first predetermined time period, which pulse signal is at a power level below that required to displace the contact set, and for providing a second supervisory pulse signal to the second relay winding in a second predetermined time period which differs from the first predetermined time period, which second pulse signal is also at a power level below that required to displace the contact set;

a controller, capable of communicating with the transponder means, including sensing means operable during said first predetermined time period to sense the presence or absence of current flow through the first relay winding, and operable during said second predetermined time period to sense the presence or absence of current flow through the second relay winding, thus providing independent supervision of the relay windings as the presence of current flow confirms both the presence and operability of each relay winding and of its associated circuitry; and a first driver unit coupled to the first winding and a second driver unit coupled to the second winding, for respectively energizing said windings as the driver units are individually energized, first shut-off means coupled to said first driver unit, and second shut-off means coupled to the second driver unit, each of said shut-off means being actuable to terminate energization of its associated winding, notwithstanding the attempted operation of the driver unit coupled to that winding.

2. A remote supervision system as claimed in claim 1, in which the latching relay's one contact set is an output contact set and each of said driver units is a semiconductor switch, and means, including the latching relay first and second shut-off means, for sensing the positions of the latching relay output contacts and using the information thus derived to terminate current flow through the energized winding.

3. A remote supervision system as claimed in claim 2, in which said sensing means is an additional contact set in the latching relay.

4. A remote supervision system as claimed in claim 2, in which the controller includes logic means for determining the state of the latched relay, using the information derived from sensing the current flow through one of the first and second windings and the absence of current flow through the other of the first and second windings.

5. A remote supervision system as claimed in claim 2, including a pair of electrical conductors coupled between the controller and the transponder means, to pass electrical signals therebetween.

6. A bidirectional, interactive communication system including a controller and a plurality of transponders, which controller is capable of two-way communication with said transponders, and a dual coil latching relay having a first winding and a second winding connected for selective actuation by one of said transponders, which relay includes a contact set for displacement as either relay winding is energized, including supervisory means in the one transponder for providing a first supervisory pulse signal to the first relay winding in a first predetermined time period, and for providing a second supervisory pulse signal in a second predetermined time period, which pulse signals are at a power level below that required to effect displacement of the contact set, and the controller further includes sensing means, operable during said first predetermined time period, to sense the presence or absence of current flow through the first relay windings, and operable during said second predetermined time period to sense the presence or absence of current flow through the second relay winding, thus providing independent supervision of the relay windings as the presence of current flow confirms both the presence and operability of each relay winding and of its associated circuitry, and a first driver unit coupled to the first winding and a second driver unit coupled to the second winding, for respectively energizing said windings as the driver units are individually energized, first shut-off means coupled to said first driver unit, and second shut-off means coupled to the second driver unit, each of said shut-off means being actuable to terminate energization of its associated winding, notwithstanding the attempted operation of the driver unit coupled to that winding.

7. A bidirectional, interactive communication system as claimed in claim 6, in which the latching relay has a set of output contacts and each of said driver units is a semiconductor switch, and means, including the latching relay, for sensing the positions of the latching relay output contacts and using the information thus derived to terminate current flow through the energized winding.

8. A bidirectional, interactive communication system as claimed in claim 9, in which said sensing means is an additional contact set in the latching relay.

9. A remote supervision system as claimed in claim 9, in which the controller includes logic means for determining the state of the latched relay, using the information derived from sensing the current flow through one cf the first and second windings and the absence of current flow through the other of the first and second windings.

10. A remote supervision system as claimed in claim 9, including a pair of electrical conductors coupled between the controller and the transponders, to facilitate said two-way communication.

11. A system for remotely supervising a dual coil latching relay having a first winding and a second winding, and an output contact set for displacement as either relay windings is energized, comprising:

a transponder, coupled to the relay, for providing a first supervisory pulse signal to the first winding in a first predetermined time period, and providing a second supervisory pulse signal in a second predetermined time period which differs from the first predetermined time period, which supervisory pulse signals are at a power level below that required to displace the contact set of the relay, including timing means for insuring the supervisory pulse signals do not displace the relay contact set;

a controller, capable of communicating with the transponder and including sensing means, operable during said predetermined time periods to sense the presence or absence of current flow through said relay windings, the presence of current flow confirming both the presence and operability of the relay and of its associated circuitry, and logic means, for regulating the provision of relay command signals to the transponder when energization of either relay winding is directed, said controller issuing relay compound signals as high level voltage pulses on the conductor pair, and the transponder issuing the first and second supervisory pulse signals during time periods when the voltage on the conductor pair is low in relation to the high level voltage pulses; and a first driver unit coupled to the first winding and a second driver unit coupled to the second winding, for respectively energizing said windings as the driver units are individually energized, first shut-off means coupled to said first driver unit, and second shut-off means coupled to the second driver unit, each of said shut-off means being actuable to terminate energization of its associated winding, notwithstanding the attempted operation of the driver unit coupled to that winding.

12. A remote supervision system as claimed in claim 11, in which each of said driver units is a semiconductor switch, and means, including an additional contact set in the latching relay to function as the first and second shut-off means, for sensing the positions of the latching relay output contact set and using the information thus derived to terminate current flow through one of said driver semiconductor switches.

13. The method of supervising a dual coil latching relay positioned at a location remote from a control point, which relay has a first winding, a second winding and at least one contact set for displacement as either relay winding is energized, comprising the steps of:

providing a first supervisory pulse signal to the first winding in a first time period, which pulse signal is at a power level below that required to displace the relay contact set;

providing a second supervisory pulse signal to the second winding in a second time period different from the first time period, which second supervisory pulse signal is also at a power level below that required to displace the relay contact set;

sensing, at the control point during said first time period, the presence and absence of current flow through said first relay winding, to confirm both the presence and operability of the first winding and of its associated circuitry;

sensing, at the control point during said second time period, the presence and absence of current flow through the second relay winding, to confirm both the presence and operability of the second winding and of its associated circuitry;

transmitting the relay command signals from the control point from time to time, to produce energization of the relay winding and displacement of the contact set; and terminating energization of the just-energized relay winding as soon as the contact set has completed the travel from one position to another.

* * * * *